United States Patent
Seshadri et al.

(10) Patent No.: US 11,912,267 B2
(45) Date of Patent: Feb. 27, 2024

(54) COLLISION AVOIDANCE SYSTEM FOR VEHICLE INTERACTIONS

(71) Applicant: HARMAN INTERNATIONAL INDUSTRIES, INCORPORATED, Stamford, CT (US)

(72) Inventors: Priya Seshadri, San Francisco, CA (US); Stefan Marti, Oakland, CA (US); Joseph Verbeke, San Francisco, CA (US); Evgeny Burmistrov, Saratoga, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 131 days.

(21) Appl. No.: 16/933,928

(22) Filed: Jul. 20, 2020

(65) Prior Publication Data

US 2022/0017077 A1 Jan. 20, 2022

(51) Int. Cl.
*B60W 30/09* (2012.01)
*B60W 30/095* (2012.01)
*B60W 40/08* (2012.01)
*B60W 50/14* (2020.01)
*B60W 60/00* (2020.01)

(52) U.S. Cl.
CPC ........ *B60W 30/09* (2013.01); *B60W 30/0956* (2013.01); *B60W 40/08* (2013.01); *B60W 50/14* (2013.01); *B60W 60/0015* (2020.02); B60W 2540/225 (2020.02); B60W 2540/227 (2020.02); B60W 2552/00 (2020.02); B60W 2554/404 (2020.02)

(58) Field of Classification Search
CPC ............ B60W 30/09; B60W 60/0015; B60W 30/0956; B60W 40/08; B60W 50/14; B60W 2540/227; B60W 2552/00; B60W 2540/225; B60W 2554/404
See application file for complete search history.

(56) References Cited

U.S. PATENT DOCUMENTS

| | | | | |
|---|---|---|---|---|
| 9,975,483 | B1 * | 5/2018 | Ramaswamy | B60Q 11/00 |
| 10,816,993 | B1 * | 10/2020 | Tran | B60Q 9/008 |
| 2015/0194057 | A1 * | 7/2015 | Jin | B60W 30/12 348/148 |
| 2016/0137199 | A1 * | 5/2016 | Kühne | B60W 30/0956 701/41 |
| 2018/0326905 | A1 * | 11/2018 | Nakata | B60Q 9/008 |
| 2020/0108869 | A1 * | 4/2020 | You | G08G 1/161 |

* cited by examiner

*Primary Examiner* — Mahmoud S Ismail
*Assistant Examiner* — Gabriel Anfinrud
(74) *Attorney, Agent, or Firm* — Artegis Law Group, LLP

(57) ABSTRACT

Embodiments of the present disclosure set forth a computer-implemented method comprising receiving, from at least one sensor, sensor data associated with an environment, generating, based on the sensor data, a set of lane change data values associated with positions of at least two vehicles relative to a first lane position in the environment, determining, based on the set of lane change data values, a collision risk value associated with the at least two vehicles attempting to occupy the first lane position, and generating, based on the collision risk value, an output signal to a first vehicle included in the at least two vehicles.

17 Claims, 5 Drawing Sheets

|  | Vehicle A | | | | | | Vehicle B | | | | | | Collision Risk? |
|---|---|---|---|---|---|---|---|---|---|---|---|---|---|
|  | LTS | RTS | HP | EG | ES(L) | ES(R) | LTS | RTS | HP | EG | ES(L) | ES(R) | |
| Scenario 1 | ○ | ● | ● | ● | ○ | ● | ● | ○ | ○ | ○ | ● | ○ | High |
| Scenario 2 | ○ | ● | ● | ● | ○ | ● | ● | ○ | ● | ● | ● | ○ | Medium |
| Scenario 3 | ○ | ● | ○ | ○ | ○ | ● | ● | ○ | ● | ● | ● | ○ | High |

FIGURE 4

COLLISION AVOIDANCE SYSTEM FOR VEHICLE INTERACTIONS

BACKGROUND

Field of the Various Embodiments

The various embodiments relate generally to vehicle systems and, more specifically, to a collision avoidance system for vehicle interactions.

Description of the Related Art

Various digital systems include digital assistants that assists users successfully perform tasks. For example, various vehicles include an advanced driver assistance system (ADAS) that assists a driver in handling a vehicle. Such an ADAS may include a driver monitoring system (DMS) that monitors the driver in order to assess the driver's handling of the vehicle and enables the ADAS to respond to the state of the driver by providing various levels of assistance, such as by generating notifications, automating various driving tasks, etc.

In some systems, the ADAS extends to monitor other vehicles on the road. Such conventional systems detect vehicles proximate to the user and provide feedback in order to assist the user in performing driving tasks. For example, a collision avoidance system may detect the presence of a vehicle or other object in an adjacent lane and may provide a warning or other feedback when the probability of collision passes a predetermined threshold. However, such drive assistance systems may not effectively monitor other portions of the road. For example, on multi-lane roads, a given driver assistance system may not be able to effectively monitor other vehicles that are not adjacent to the vehicle. As a result, the user has a greater risk of collision with such vehicles, as the ADAS system does not provide adequate feedback to help the user to interact with such vehicles.

In view of the above, more effective techniques for monitoring a driving environment would be useful.

SUMMARY

Embodiments of the present disclosure set forth a computer-implemented method comprising receiving, from at least one sensor, sensor data associated with an environment, generating, based on the sensor data, a set of lane change data values associated with positions of at least two vehicles relative to a first lane position in the environment, determining, based on the set of lane change data values, a collision risk value associated with the at least two vehicles attempting to occupy the first lane position, and generating, based on the collision risk value, an output signal to a first vehicle included in the at least two vehicles.

Further embodiments provide, among other things, a system and a non-transitory computer readable storage medium configured to implement the method set forth above.

At least one technological advantage of the disclosed embodiments is that a driver of a vehicle is notified of potential collisions with vehicles that are not in adjacent lanes. In particular, by acquiring sensor data associated with vehicles from a near lane that is not immediately adjacent to the vehicle, the collision avoidance system may notify a driver of more potential collisions than would otherwise be detected by only analyzing vehicles that currently occupy the adjacent lane. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 4 illustrates the collision avoidance system of FIG. 1 determining collision risk values in response to conditions relative to two vehicles, according to various embodiments.

For clarity, identical reference numbers have been used, where applicable, to designate identical elements that are common between figures. It is contemplated that features of one embodiment may be incorporated in other embodiments without further recitation.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Figure 1:
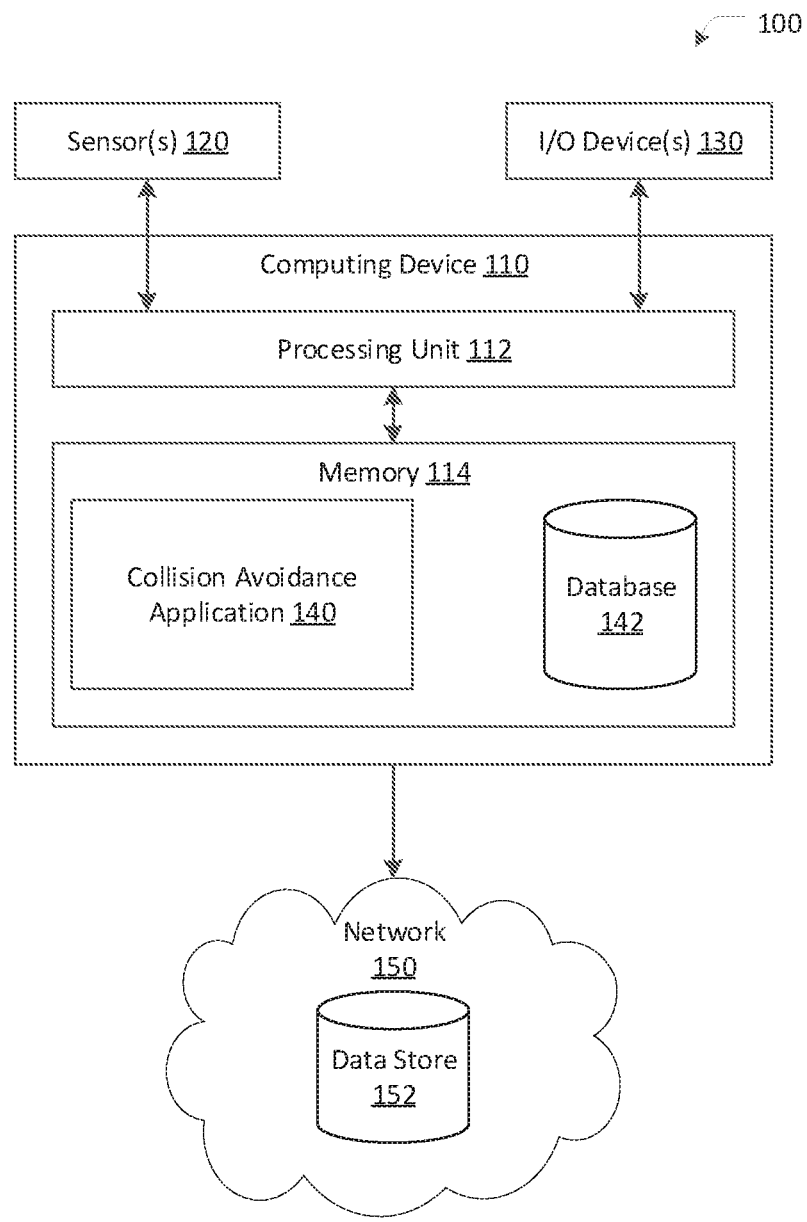
FIG. 1 illustrates a block diagram of the collision avoidance system configured to implement one or more aspects of the present disclosure.

FIG. 1 illustrates a block diagram of the collision avoidance system 100 configured to implement one or more aspects of the present disclosure. As shown, collision avoidance system 100 includes, without limitation, computing device 110, sensor(s) 120, input/output (I/O) device(s) 130, and network 150. Computing device 110 includes processing unit 112 and memory 114, where memory 114 stores collision avoidance application 140 and database 142. Network 150 includes data store 152.

In operation, processing unit 112 receives sensor data from sensor(s) 120. Processing unit 112 executes collision avoidance application 140 to in order to process the sensor data and determine various lane change data values associated with attempting to occupy an empty lane position within a driving environment. The lane change data values are associated with one or more driver and/or vehicles within the driving environment. In various embodiments, such data values may include driver values, such as the head position of a given driver and the eye gaze direction of the given driver. Additionally or alternatively, such data values may include contextual information, such as driving parameters (e.g., engaged turn signals, speed, etc.) of a given vehicle, presence of empty lane positions ("empty spots") within the driving environment, positions of other vehicles, and so forth. Upon generating a set of lane change data values, collision avoidance application 140 processes the set using one or more prediction algorithms in order to compute a collision risk value that indicates a probability of collision if a given vehicle attempts to occupy a given empty lane position. Collision avoidance application 140 generates an output signal based on the collision risk value. For example, collision avoidance application 140 may be a component of an advanced driver assistance system (ADAS) that automates certain tasks and/or provides notifications via one or more output signals when collision avoidance application 140 determines a substantial risk (e.g., medium or high collision risk values).

As noted above, computing device 110 can include processing unit 112 and memory 114. Computing device 110 can be a device that includes one or more processing units 112, such as a system-on-a-chip (SoC). In various embodiments, computing device 110 may be a mobile computing device, such as a tablet computer, mobile phone, media player, and so forth. In some embodiments, computing device 110 may be a head unit included in a vehicle system. Generally, computing device 110 can be configured to coordinate the overall operation of collision avoidance system 100. The embodiments disclosed herein contemplate any technically-feasible system configured to implement the functionality of collision avoidance system 100 via computing device 110.

Various examples of computing device 110 include mobile devices (e.g., cellphones, tablets, laptops, etc.), wearable devices (e.g., watches, rings, bracelets, headphones, etc.), consumer products (e.g., gaming, gambling, etc.), smart home devices (e.g., smart lighting systems, security systems, digital assistants, etc.), communications systems (e.g., conference call systems, video conferencing systems, etc.), and so forth. Computing device 110 may be located in various environments including, without limitation, road vehicle environments (e.g., consumer car, commercial truck, etc.), aerospace and/or aeronautical environments (e.g., airplanes, helicopters, spaceships, etc.), nautical and submarine environments, and so forth.

Processing unit 112 may include a central processing unit (CPU), a digital signal processing unit (DSP), a microprocessor, an application-specific integrated circuit (ASIC), a neural processing unit (NPU), a graphics processing unit (GPU), a field-programmable gate array (FPGA), and so forth. Processing unit 112 generally comprises a programmable processor that executes program instructions to manipulate input data. In some embodiments, processing unit 112 may include any number of processing cores, memories, and other modules for facilitating program execution. For example, processing unit 112 could receive input from a user via I/O devices 130 and generate pixels for display on I/O device 130 (e.g., a display device).

Memory 114 can include a memory module or collection of memory modules. Memory 114 generally comprises storage chips such as random-access memory (RAM) chips that store application programs and data for processing by processing unit 112. In various embodiments, memory 114 may include non-volatile memory, such as optical drives, magnetic drives, flash drives, or other storage. In some embodiments, separate data stores, such as data store 152 included in network 150 ("cloud storage") may supplement memory 114. Collision avoidance application 140 within memory 114 can be executed by processing unit 112 to implement the overall functionality of the computing device 110 and, thus, to coordinate the operation of the collision avoidance system 100 as a whole.

Collision avoidance application 140 processes acquired sensor data associated with a given driver, vehicle, and/or environment in order to determine various data values associated with the presence of empty lane positions within the environment and intentions of one or more driver to occupy a given empty lane position. In various embodiments, collision avoidance application 140 may receive sensor data from sensor(s) 120 and may analyze the sensor data in order to generate lane change data values indicating whether one or more drivers are intending to move into an empty lane position. Collision avoidance application 140 analyzes the set of lane change data values to compute a collision risk value that indicates whether multiple drivers are intending to move into the empty lane position. Collision avoidance application 140 then generates the collision risk value to produce an output signal for one or more input/output (I/O) devices 130.

For example, collision avoidance application 140 may determine that a collision risk value is about a threshold level indicating a safe movement into a target empty lane position. Collision avoidance application 140 could then send an output signal as an ADAS notification that causes I/O device 130 (e.g., a compartment speaker) play a notification sound to alert the driver. In some instances, the ADAS could also respond by performing one or more automated tasks (e.g., assisted driving, transmitting vehicle-to-vehicle (V2V) communications, etc.).

Database 142 can store values and other data retrieved by processing unit 112 to coordinate the operation of collision avoidance application 140. In various embodiments, processing unit 112 may be configured to store values in database 142 and/or retrieve values stored in database 142. For example, database 142 could store lookup tables, collision risk algorithms, mappings of sensor values to collision risk values, and so forth. In some embodiments, database 142 may store values retrieved from data store 152. In such instances, database 142 may receive periodic updates and provide values to collision avoidance application 140 between the periodic updates.

Sensor(s) 120 may include one or more devices that perform measurements and/or acquire data related to certain subjects in an environment. In various embodiments, sensor(s) 120 may generate sensor data that is related to one or more drivers and/or vehicles within the environment. For example, sensor(s) 120 could collect image data related to a driver (e.g., head position, eye position), as well as other sensor data associated with the driver, such as biometric data (e.g., heart rate, brain activity, skin conductance, blood oxygenation, pupil size, galvanic skin response, blood-pressure level, average blood glucose concentration, etc.). Additionally or alternatively, sensor(s) 120 can generate sensor data related to objects in the environment that are not the user. For example, sensor(s) 120 could generate sensor data about the operation of a vehicle, including the state of one or more turn signals, the speed of the vehicle, the ambient temperature in the vehicle, the amount of light within the vehicle, and so forth. In some embodiments, sensor(s) 120 may be coupled to and/or included within computing device 110 and send sensor data to processing unit 112. Processing unit 112 executes collision avoidance application 140 in order to determine a collision risk value based on a set of lane change data values, where the set is derived from the acquired sensor data.

In various embodiments, sensor(s) 120 may acquire sensor information associated with a specific driver. For example, sensor(s) 120 could include a driver-facing camera that records the face of a primary driver (e.g., driver of the vehicle that includes collision avoidance system 100) as image data. Collision avoidance application 140 could then analyze the image data in order to determine the head position of the driver to determine whether the driver has viewed other vehicles and/or the target empty lane position. In another example, sensor(s) 120 could include an eye sensor (e.g., a camera focused on the eyes of the user) that acquires image data about at least one eye of the user. Collision avoidance application 140 could then perform various techniques to detect eye parameters (e.g., eye motions, fluctuations in the user's pupil diameter(s), gaze direction(s) of the eye(s), eye lid position(s), eye lid motion(s), etc.).

In some embodiments, sensor(s) 120 could include sensors that acquire biological and/or physiological signals of a user (e.g., perspiration, heart rate, heart-rate variability (HRV), blood flow, blood-oxygen levels, breathing rate, galvanic skin response (GSR), sounds created by a user, behaviors of a user, etc.). In such instances, collision avoidance application 140 could generate one or more lane change data values that collision avoidance application 140 analyzes when generating the collision risk value. In another example, sensor(s) 120 could include heart rate sensors and/or other biometric sensors that acquire biological and/or physiological signals of the user (e.g., heart rate, breathing rate, eye motions, GSR, neural brain activity, etc.). In such instances, collision avoidance application 140 could compute the cognitive load from one or more of the acquired biological and/or physiological signals.

In various embodiments, the sensor(s) 120 may include optical sensors, such as RGB cameras, infrared cameras, depth cameras, and/or camera arrays, which include two or more of such cameras. Other optical sensors may include imagers and laser sensors. In some embodiments, sensor(s) 120 may include physical sensors, such as touch sensors, pressure sensors, position sensors (e.g., an accelerometer and/or an inertial measurement unit (IMU)), motion sensors, and so forth, that register the body position and/or movement of the user. In such instances, collision avoidance application 140 may analyze the acquired sensor data to determine the movement of the user, and then correlate such movement with specific emotions (e.g., boredom, fatigue, arousal, etc.) and/or a cognitive load of the user. In various embodiments, the sensor(s) 120 may include physiology sensors, such as heart-rate monitors, electroencephalography (EEG) systems, radio sensors, thermal sensors, galvanic skin response sensors (e.g., sensors that measure change in electrical resistance of skin caused by emotional stress), contactless sensor systems, magnetoencephalography (MEG) systems, ultrasonic sensors, radar sensors, and so forth.

In addition, in some embodiments, sensor(s) 120 may include acoustic sensors, such as a microphone and/or a microphone array that acquires sound data. Such sound data may be processed by collision avoidance application 140 performing various natural language (NL) processing techniques, sentiment analysis, and/or speech analysis in order to determine the semantic meaning of the phrases spoken in the environment. In some embodiments, sensor(s) 120 may include behavioral sensors that detect the activity of the user within the environment. Such behavioral sensors may include devices that acquire related activity data, such as devices that acquire application usage data and/or mobile device usage data. In such instances, collision avoidance application 140 may analyze a route included in a navigation application to determine whether the driver intends to change lanes.

I/O device(s) 130 may include devices capable of receiving input, such as a keyboard, a mouse, a touch-sensitive screen, a microphone, and/or other input devices for providing input data to computing device 110. In various embodiments, I/O device(s) 130 may include devices capable of providing output, such as a display screen, loudspeakers, haptic actuators, and the like. One or more of I/O devices 130 can be incorporated in computing device 110, or may be external to computing device 110. In some embodiments, computing device 110 and/or one or more I/O device(s) 130 may be components of an advanced driver assistance system.

Network 150 may enable communications between computing device 110 and other devices in network via wired and/or wireless communications protocols, including Bluetooth, Bluetooth low energy (BLE), wireless local area network (WiFi), cellular protocols, satellite networks, V2V and/or V2X networks, and/or near-field communications (NFC). In various embodiments, network 150 may include one or more data stores 152 that store data associated with sensor data, biometric values, affective-cognitive loads, and/or driver readiness levels. In various embodiments, collision avoidance application 140 and/or other digital assistants included in other devices may retrieve information from the data store 152. In such instances, collision avoidance application 140 may analyze the retrieved data as part of determining lane change data values, determining a collision risk value, and so forth.

Figure 2:
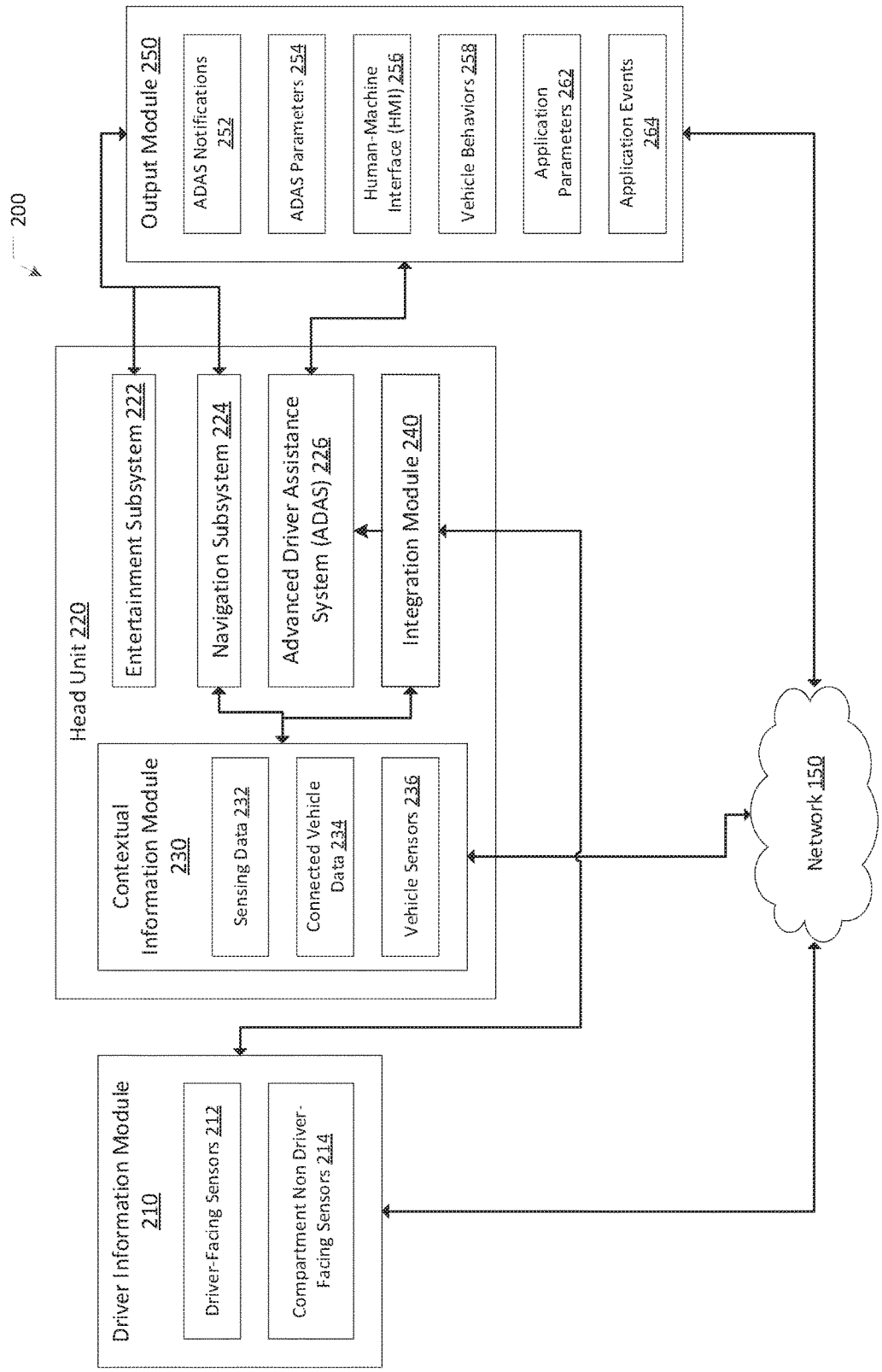
FIG. 2 illustrates an example vehicle system that executes the collision avoidance system of FIG. 1, according to various embodiments.

FIG. 2 illustrates an example vehicle system 200 that executes the collision avoidance system of FIG. 1, according to various embodiments. As shown, vehicle system 200 includes driver information module 210, head unit 220, network 150, and output module 250. Driver information module 210 includes driver-facing sensors 212 and compartment non-driver-facing sensors 214. Head unit 220 includes entertainment subsystem 222, navigation subsystem 224, contextual information module 230, advanced driver assistance system (ADAS) 226, and integration module 240. Contextual information module 230 includes sensing data 232, connected vehicle data 234, and vehicle sensors 236. Output module 250 includes ADAS notifications 252, ADAS parameters 254, human-machine interface (HMI) 256, vehicle behaviors 258, application parameters 262, and application events 264.

In various embodiments, one or more of driver information module 210 and/or contextual information module 230 may receive sensor data (e.g., sensing data 232) from sensors 212, 214, 236, and/or other data (e.g., connected vehicle data 234) from other sources. In various embodiments, one or more of driver information module 210 and/or contextual information module 230 may generate lane change data values that indicate the intention of one or more drivers (e.g., turn signals to enter into an adjacent lane). Integration module 240 may be included in head unit 220 and/or ADAS 226 and receives multiple lane change data values and processes the lane change data value to determine whether one or more drivers intend to move into a specific area. When integration module 240 determines that at least one driver intends to enter into a specific area, integration module generates a collision risk value that indicates that a collision is likely. In some embodiments, integration module 240 sends the collision risk value to output module 250 that generates a specific output signal to drive one or more output devices 130. In some embodiments, integration module generates an output signal that output module 250 receives and converts to a specific output (e.g., ADAS notification) that drives a specific output (e.g., ADAS 226).

For example, driver information module 210 could receive image data via driver-facing sensors 212 and determine a head position of the driver indicating that the driver is looking in the direction of an empty lane position and a nearby vehicle in another lane. Driver information module 210 could be generating a head position data value to be included in the set of lane change data values. Contextual information module 230 could receive sensing data 232 from one or more outward-facing cameras in vehicle sensors 236 that include image data of the turn light of the nearby vehicle and an image of the nearby driver. Contextual information module 230 could then generate separate data values indicating the head position of the driver (e.g., looking at the empty lane position) and the state of the turn signal (e.g., left-turning signal is on). Integration module could then receive each separate data value and determine that both drivers intend to move into the empty lane space. Integration module 240 could then generate a collision risk value indicating a high probability of collision and transmit the collision risk value to output module 250. Output module 250 could then respond to the high collision risk value by generating an audio, haptic, and/or visual signal that is delivered via HMI 256.

Driver information module 210 includes multiple types of sensors, including driver-facing sensors 212 (e.g., cameras, motion sensors, etc.) and compartment non-driver-facing sensors 214 (e.g., motion sensors, pressure sensors, temperature sensors, etc.). In various embodiments, driver information module 210 generates one or more lane change data values (e.g., head position, eye gaze direction, etc.) from data acquired via driver-facing sensors 212 and/or non-driver-facing sensors 214. In various embodiments, driver information module 210 may process the sensor data using various techniques to identify specific data values. For example, driver information module 210 could apply one or more image processing algorithms to identify the head position of the driver relative to an empty lane position and/or a nearby vehicle. In some embodiments, driver information module 210 may process sensor data in order to assess the attentiveness of the driver, where lower attentiveness indicates a higher risk for collision. For example, driver information module 210 may process biometric sensor data in order to generate a low attentiveness as a lane change data value.

Additionally and alternatively, ML models may be trained from any combination of sensing data to identify specific lane change data values. The ML models may be trained to classify images and/or acquired sensor data. In such instances, driver information module 210 inputs newly-acquired sensor data as input and the ML model may then be able to generate values, such as a value indicating the head position of the user and/or a value indicating whether the user is looking in the applicable direction (e.g., whether the driver is looking to the left lane when the empty lane position is to the left of the vehicle).

In various embodiments, head unit 220 may be mounted at any location within a passenger compartment of a vehicle in any technically-feasible fashion. In some embodiments, head unit 220 may include any number and type of instrumentation and applications, and may provide any number of input and output mechanisms. For example, head unit 220 could enable users (e.g., the driver and/or passengers) to control entertainment subsystem 222 and/or navigation sub system 224.

Head unit 220 supports any number of input and output data types and formats, as known in the art. For example, head unit 220 could include built-in Bluetooth for hands-free calling and/or audio streaming, universal serial bus (USB) connections, speech recognition, rear-view camera inputs, video outputs for any number and type of displays, and any number of audio outputs. In general, any number of sensors (e.g., sensor(s) 120), displays, receivers, transmitters, etc., may be integrated into head unit 220, or may be implemented externally to head unit 220. In various embodiments, external devices may communicate with head unit 220 in any technically-feasible fashion.

Contextual information module 230 generates data values from one or more inputs, such as sensing data 232 received from other sources (e.g., non-vehicle sensors, sensing data from remote devices, etc.), acquired sensor data from vehicle sensors 236, as well as data from other sources, such as connected vehicle data 234. In some embodiments, contextual information module 230 receives data from other components, such as navigation subsystem 224 and/or entertainment subsystem 222. In various embodiments, contextual information module 230 may retrieve historical data (e.g., previous image data, calculations that were computed by remote devices, etc.). For example, contextual information module 230 could compare the current position of the empty lane position relative to previous positions to determine whether the empty lane position remains available. In another example, contextual information module 230 could compare image data associated with turn lights of a nearby vehicle with previously captured turn lights in order to determine the state of the turn light with greater accuracy.

Connected vehicle data 234 may be one or more signals received as vehicle-to-vehicle (V2V) signals, wireless signals, and/or other signals received by a given vehicle that were generated by a separate vehicle. Vehicle sensors 236 include internal and/or external sensors (e.g., outward-facing cameras, accelerometers, etc.). Such external sensors may include optical sensors, acoustic sensors, road vibration sensors, temperature sensors, etc. In some embodiments, contextual information module 230 may acquire other external data, such as geolocation data (e.g., GNNS systems, including a global positioning system (GPS), Glonass, Galileo, etc.).

For example, a primary vehicle could capture image data of a nearby vehicle, while the nearby vehicle could broadcast a V2V signal broadcasting its speed. In such instances, contextual information module 230 could generate one or more data values from the acquired sensor data and connected vehicle data, where the data values (e.g., head position of the nearby driver, speed of the nearby vehicle) are associated with the nearby vehicle and indicates intended navigation of the nearby vehicle.

Entertainment subsystem 222 and/or navigation subsystem 224 may provide specific inputs to contextual information module 230. For example, navigation subsystem 224 may provide route information (e.g., an indication that the primary vehicle is to change lanes). Additionally or alternatively, entertainment subsystem 222 and/or navigation subsystem 224 may receive specific output signals provided by output module 250. For example, entertainment subsystem 222 may receive a notification sound via HMI 256 and may cause speakers within the compartment to emit the notification sound.

Advanced driver assistance system (ADAS) 226 automates certain tasks and/or provides notifications via one or more output signals to assist the driver in operating the vehicle. In some embodiments, ADAS 226 includes integration module 240 and generates the collision risk value. In such instances, ADAS 226 could respond to the collision risk value by performing certain vehicle operations (e.g., engaging in the horn to alert the nearby vehicle).

Output module 250 performs one or more actions in response to an output signal and/or collision risk value that is provided by integration module 240. For example, output module 250 could generate one or more output signals in response to the collision risk value, where the output signal modifies an application and/or interface. For example, output module 250 could generate one or more output signals to modify HMI 256 to display notification messages and/or alerts. In another example, output module 250 could generate one or more output signals to modify an application. In such instances, the output signal may include application parameters 262 and/or application events 264.

In various embodiments, ADAS notifications 252 may include light indications, such as ambient lights and mood lights, audio notifications, voice notifications (e.g., a voice assistant), visual notification messages, haptic notifications in the vehicle (e.g., steering wheel, seat, head rest, etc.) or wearable device or touchless haptic notifications, etc. In various embodiments, ADAS parameters 254 may include various operating parameters, settings, or actions. For example, ADAS parameters 254 could include vehicle climate control settings (e.g., window controls, passenger compartment temperature, increasing fan speed, etc.), and/or olfactory parameters, such as emitting specific fragrances that are calming or stimulating. In various embodiments, ADAS parameters 254 may include emergency calling parameters, such as triggering the dialing of one or more emergency phone numbers, or suggesting that the user connect to a specific contact situation that may require immediate assistance and/or response.

In various embodiments, ADAS parameters 254 may dynamically activate L2+/L3+ semi-autonomous driving capabilities, such as lane keep assist (LKA), collision avoidance, and/or autonomous driving. In some embodiments, ADAS parameter 254 may be a binary activation signal (on/off); alternatively, ADAS parameters 254 may be activation signal that provides a more-gradual activation (e.g., with varying degrees of automated correction when the driver seems to deviate from their lane). In some embodiments, ADAS parameters 254 may dynamically activate the collision avoidance systems. For example, output module 250 may dynamically generate ADAS parameters 254 that adapt the parameters of the system (e.g., warning time, brake intensity, etc.) depending on the collision risk value.

Figure 3:
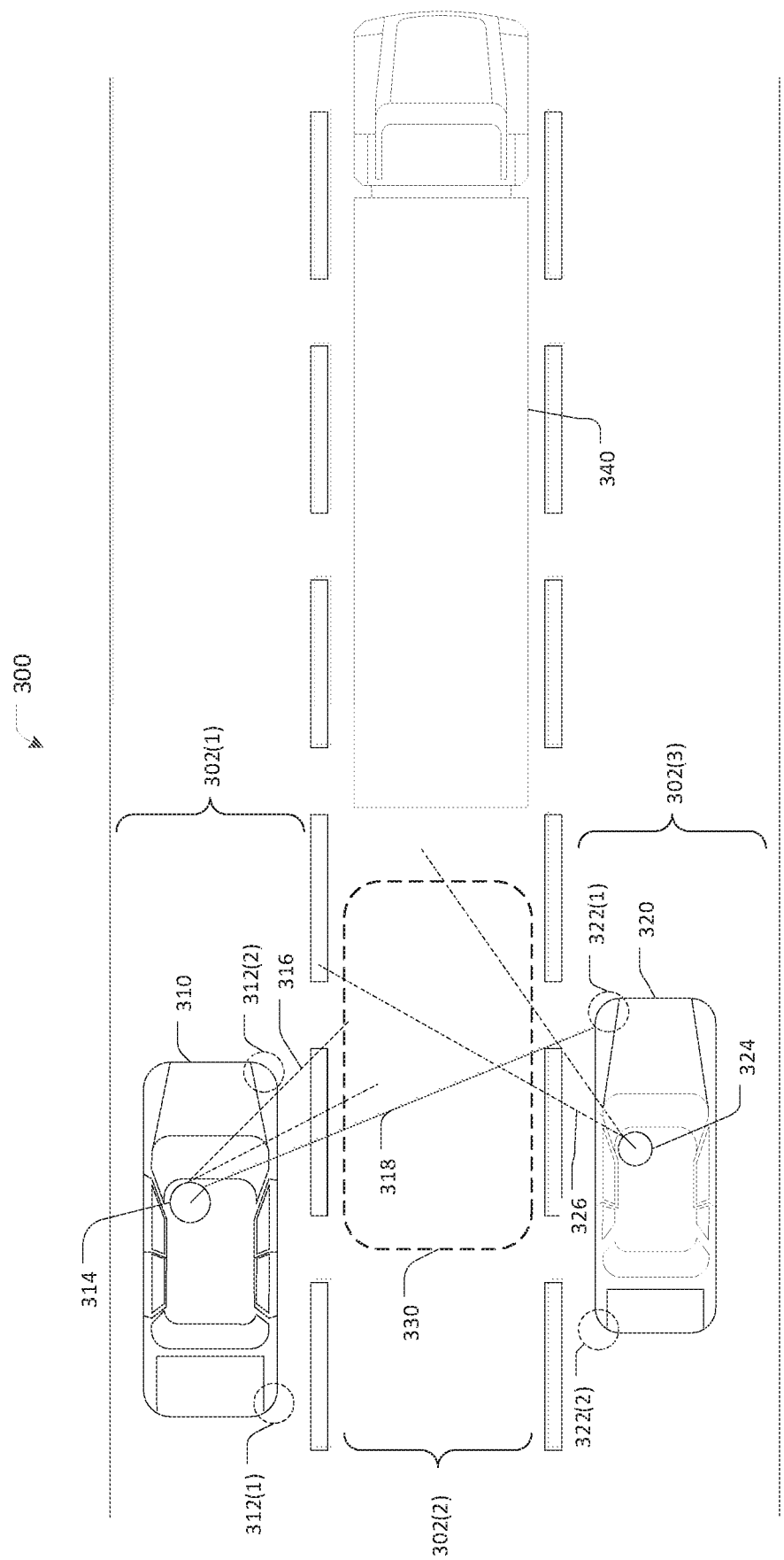
FIG. 3 illustrates a driving environment for a vehicle that includes the collision avoidance system of FIG. 1, according to various embodiments.

FIG. 3 illustrates a driving environment 300 for a vehicle that includes the collision avoidance system of FIG. 1, according to various embodiments. Driving environment 300 includes vehicles 310, 320, 340 in separate lanes 302. Primary vehicle 310 is driving in left lane 302(1), adjacent vehicle 340 is in adjacent lane 302(2), and secondary vehicle 320 is in nearby (e.g., right) lane 302(2).

In operation, collision avoidance application 140 included in primary vehicle 310 detects empty lane position 330 in the adjacent lane. Collision avoidance application 140 analyzes sensor data to determine data values associated with one or more components of primary vehicle 310, adjacent vehicle 340, and/or secondary vehicle 320 to generate a collision risk value that indicates the risk for collision, such as when both primary vehicle 310 and secondary vehicle 320 attempt to change lanes and occupy empty lane position 330.

In various embodiments, collision avoidance application 140 may determine one or more lane change data values about primary vehicle 310 and/or the primary driver (e.g., the driver of primary vehicle 310). As shown, for example, collision avoidance application 140 could acquire sensor data and determine the state of primary turn signals 312 (e.g., right turn signals 312(1), 312(2)). Collision avoidance application 140 could also determine the lane change data values associated with the primary driver, including head position (HP) 314 and/or eye gaze direction (EG) 316. For example, collision avoidance application 140 could analyze sensor data acquired by one or more driver-facing sensors 212 in order to determine that the primary driver is looking in the direction of empty lane position 330, where head position 314 and eye gaze direction 316 do not indicate that the primary driver has viewed secondary vehicle 320.

Additionally or alternatively, collision avoidance application 140 may determine one or more lane change data values about other vehicles and/or drivers, such as adjacent vehicle 340, secondary vehicle 320, and/or the secondary driver (e.g., the driver of secondary vehicle 320. In various embodiments, collision avoidance application 140 may analyze sensor data associated with adjacent vehicle 340 in order to compute the size of empty lane position 330 and determine whether primary vehicle 310 can safely occupy the empty lane position 330. Similarly, collision avoidance application 140 could determine that, due to adjacent vehicle 340, empty lane position 330 is the only available position in lane 302(2).

As shown, for example, collision avoidance application 140 could acquire sensor data and determine the state of second turn signals 322 of secondary vehicle 320 (e.g., left turn signals 322(1), 322(2)). Collision avoidance application 140 could also determine the lane change data values associated with the secondary driver, including head position 324 and/or eye gaze direction 326. For example, collision avoidance application 140 could analyze sensor data acquired by one or more vehicle sensors 236 in order to determine that the secondary driver is looking in the direction of empty lane position 330, where head position 324 and eye gaze direction 326 do not indicate that the secondary driver has viewed primary vehicle 310.

Following the above example, integration module 240 may aggregate and process the set of lane change data values to determine that (i) the primary driver intends to move primary vehicle 310 into empty lane position 330, (ii) the secondary driver intends to move secondary vehicle 320 into empty lane position 330, (iii) the primary driver has not seen secondary vehicle 320, and (iv) the secondary driver has not seen primary vehicle 310. In such instances, integration module generates a high collision risk value and collision avoidance application 140 generates one or more output signals based on the high collision risk value. For example, collision avoidance application 140 could generate an ADAS notification 252 as an output signal in primary vehicle 310 that provides a warning to the primary driver.

In another example, collision avoidance application 140 could determine that adjacent vehicle 340 is distracting the primary driver and/or secondary driver. Collision avoidance application 140 could also determine that an attempt to change lanes by the primary driver and/or secondary driver would lead to a collision due to adjacent vehicle 340 blocking other lane positions, limiting the ability for both vehicles 310, 320 to change speeds and safely move into lane 302(2). In such instances, collision avoidance application 140 could respond by generating one or more output signals based on the high collision risk value.

In one example, the primary driver could look toward the left turn signal 322(1) of secondary vehicle 320. In such instances, collision avoidance application 140 could determine a specific eye gaze direction 318 and, based on the position of secondary vehicle 320, determine that the primary driver saw the left turn signal 322(1). Upon acquiring state data associated with left turn signal 322(1), collision avoidance application 140 could also determine that the primary driver saw an activated left turn signal 322(1). For example, collision avoidance application 140 may compare the time range that left turn signal 322(1) is activated with the time range that the primary driver was gazing in the direction of left turn signal 322(1) to form eye gaze direction 318 to determine whether the time ranges overlap. When collision avoidance application 140 determines that the primary driver saw the active left turn signal 322(1), collision avoidance application 140 could determine that the collision risk is lower (e.g., either a medium or low risk value) and respond based on the overall collision risk value.

FIG. 4 illustrates the collision avoidance system 100 of FIG. 1 determining collision risk values in response to conditions relative to two vehicles, according to various embodiments. As shown, collision risk value table 400 includes primary vehicle ("Vehicle A") lane change data values 410, secondary vehicle ("Vehicle B") lane change data values 420, and separate rows 432-436 that each indicate separate scenarios.

For a given scenario, integration module 240 assesses the set of lane change data values to generate a specific collision risk value 442, 444, 446. In table 400, valid values are indicated by closed circles and invalid values (e.g., turn signal light is off, no empty lane position in the lane left of primary vehicle 310) are indicated by an open circle. In instances where collision avoidance application 140 does not receive a specific value (e.g., does not determine the eye gaze position of the secondary driver), collision avoidance application 140 marks the data value as invalid.

For the first collision detection scenario 432 ("Scenario 1"), collision avoidance application 140 may respond to a triggering event (e.g., engaging the right turn signal (RTS)) by acquiring and processing sensor data. In this instance, collision avoidance application 140 determined valid lane change data values indicating that primary vehicle 310 has an empty lane position to the right of the vehicle, the primary vehicle has an active right turn signal (RTS), inactive left turn signal (LTS), and the driver has looked in the direction of secondary vehicle 320 (as indicated by the head position (HP) and the eye gaze direction (EG)). Further, collision avoidance application 140 determined valid lane change data values indicating that secondary vehicle 320 has an empty lane position to the left of the vehicle, the secondary vehicle has an active left turn signal, inactive right turn signal, and the secondary driver has not looked in the direction of primary vehicle 310 (as indicated by the head position and the eye gaze direction).

In such a scenario, collision avoidance application 140 could determine that the primary driver has seen the secondary driver, but the secondary driver has not seen the primary driver, while both drivers are intending to occupy the same position of the empty lane position 330. Collision avoidance application 140 could then generate a collision risk value 442 of "HIGH" and generate output signals (e.g., a warning signal not to change lanes) based on the collision risk value being high.

In other scenarios, collision avoidance application 140 may make similar determinations of the collision risk value. For example, upon assessing the second scenario 434, ("Scenario 2") collision avoidance application 140 could determine that both drivers are intending to occupy the same position of the empty lane position 330 and both drivers have seen each other. Collision avoidance application 140 could then generate a collision risk value 442 of "MEDIUM" due to the lower risk of collision and generate output signals (e.g., a warning signal to use caution) based on the collision risk value being medium.

In some embodiments, collision avoidance application 140 may change collision risk value 442 to a different value (e.g., changing from "MEDIUM" to "LOW"). For example, collision avoidance application 140 could initially determine that the secondary driver initially intended to move into empty lane position 330, but changed her mind and no longer intends to attempt the move (e.g., determine that left turn signals 322 were initially activated, but deactivated after the secondary driver gazed towards primary vehicle 310). In such instances, collision avoidance application 140 could generate a collision risk value 442 of "LOW" and generate output signals (e.g., positive sound to indicate that the lane change is safe) based on the collision risk being low.

In another example, when assessing the third scenario 436 ("Scenario 3"), collision avoidance application 140 could have difficulty processing sensor data associated with the primary driver and may not conclusively determine the head position and/or eye gaze position of the primary driver. In such instances, collision avoidance application 140 could mark both lane change data values as invalid and make the determination that the primary driver has not seen the secondary vehicle 320, the secondary driver has seen the primary vehicle 310, and both drivers are intending to occupy the same position of the empty lane position 330. Collision avoidance application 140 could then generate a collision risk value 446 of "HIGH" and generate output signals (e.g., a warning signal not to change lanes) based on the collision risk value being high.

In various embodiments, collision avoidance application 140 may assess varying sets of lane change data values. For example, collision avoidance application may receive audio data, such as a siren, indicating that an out-of-view vehicle is likely to cause a collision when the primary driver attempts to occupy the empty lane position 330.

In various embodiments, collision avoidance application 140 may apply different weight values and/or confidence values to each lane change data value. For example, collision avoidance application 140 may apply a greater weight to eye gaze direction as a more accurate indication of the direction a driver is looking. In such instances, when the head position and eye gaze direction provide conflicting information, collision avoidance application 140 may more heavily rely on the determination of the eye gaze direction. In another example, collision avoidance application 140 may apply confidence values to a computed eye gaze direction and/or head position that reflects the estimated accuracy of the values computed by collision avoidance application 140 (e.g., determining eye gaze in low-light conditions, a driver wearing sunglasses, etc.). In such instances, collision avoidance application 140 could apply a higher confidence value to the computed head position to reflect a greater confidence that collision avoidance application 140 accurately estimated the head position of the primary driver from the acquired sensor data.

Additionally or alternatively, one or more of primary vehicle 310, secondary vehicle 320, and/or adjacent vehicle 340 are autonomous or semi-autonomous vehicles. In such instances, collision avoidance application 140 may apply zero or small weight values to avoid reliance on a person who may not be controlling the operation of the vehicle.

Figure 5:
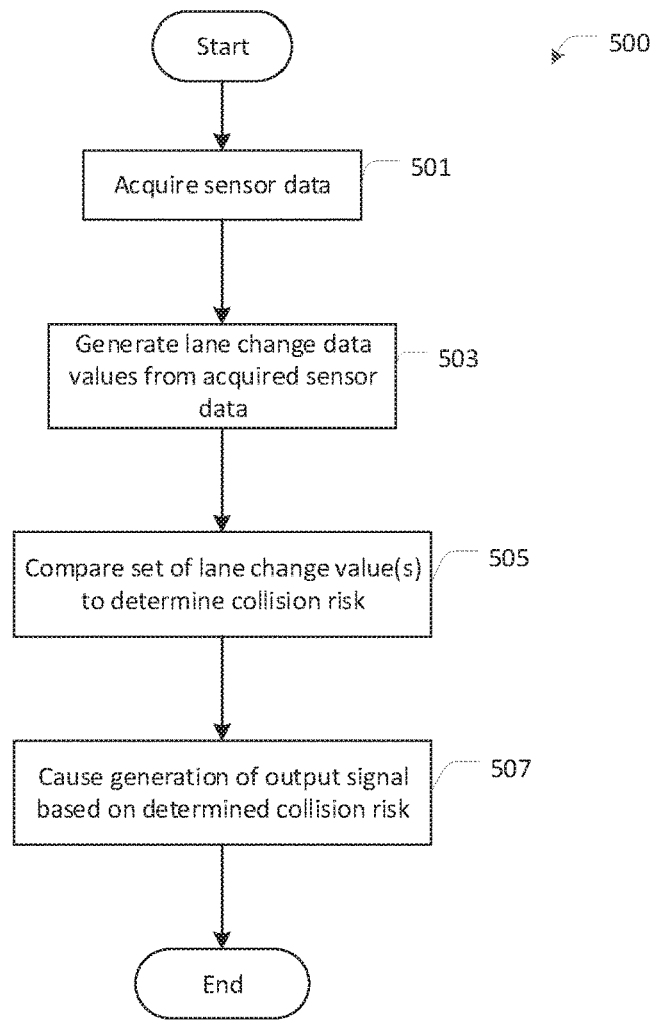
FIG. 5 is a flowchart of method steps for identifying a collision risk, according to various embodiments.

FIG. 5 is a flowchart of method steps for identifying a collision risk, according to various embodiments. Although the method steps are described with respect to the systems of FIGS. 1-4, persons skilled in the art will understand that any system configured to perform the method steps, in any order, falls within the scope of the various embodiments.

As shown, method 500 begins at step 501, where collision avoidance application 140 acquires sensor data. In various embodiments, one or more of driver information module 210 and/or contextual information module 230 may acquire sensor data associated with a vehicle environment. In some embodiments, collision avoidance application 140 responds to a triggering event, such as a primary driver initiating a turn signal, by acquiring sensor data. Alternatively, collision avoidance application 140 may continually acquire sensor data.

At step 503, collision avoidance application 140 generates lane change data values from the acquired sensor data. In some embodiments, driver information module 210 and/or contextual information module 230 may process the acquired sensor data to generate one or more lane change data values that are associated with one or more vehicles attempting to occupy an empty lane position. In some embodiments, collision avoidance application 140 may process the acquired sensor data in order to identify at least one empty lane position that the primary vehicle can occupy by changing position relative to other vehicles within the vehicle environment. In such instances, collision avoidance application 140 may generate lane change data value associated with one or more vehicles (e.g., the primary vehicle and one or more secondary vehicles) that are attempting to occupy the empty lane position.

At step 505, collision avoidance application 140 compares the set of lane change values in order to determine a collision risk. In various embodiments, integration module 240 may aggregate the lane change data values and process the set of lane change data values in order to determine the likelihood of collision when the primary driver attempts to occupy the empty lane position 330. In some embodiments, integration module 240 generates a collision risk value that indicates the likelihood that a driver is intending to move into the empty lane position 330, as well as the likelihood that the driver will attempt the move without seeing other vehicles that are also attempting to occupy the empty lane position. In such instances, collision avoidance application 140 assesses the set of lane change data values (e.g., eye gaze direction, head position, driver attentiveness, vehicle parameters, etc.) and generates a collision risk value (e.g., low, medium, high) based on at least a portion of the lane change data values included in the set.

At step 507, collision avoidance application 140 causes the generation of an output signal based on the determined collision risk. In various embodiments, output module 250 provides one or more output signals based on the collision risk value. In various embodiments, output module 250 generates an output signal that provides a notification or other feedback to the primary driver to warn or stop the driver due to a heightened collision risk. In some embodiments, output module 250 generates an output signal that modifies a driving parameter (e.g., slows speed of the vehicle) in order to lower the collision risk.

In sum, a collision avoidance application receives sensor data and determines whether multiple vehicles intend to change lanes into the same empty lane position. Various sensors acquire sensor data associated with one or more drivers and one or more vehicles in a particular driving environment. The collision avoidance application determines, for a given vehicle, whether a lane position in an adjacent lane is unoccupied. Upon identifying the presence of the empty lane position, the collision avoidance application processes the sensor data to generate set of lane change data values that indicate whether one or more vehicles are intending to occupy the empty lane position. In various embodiments, the collision avoidance application generates lane change data values associated with the drivers, such as head position and/or eye gaze direction indicating an intention to shift the applicable vehicle into the empty lane position. Additionally or alternatively, the collision avoidance application generates lane change data values associated with the vehicles, such as initiating turn signals.

Upon generating the set of lane change data values, the collision avoidance application determines a collision risk value that indicates whether the drivers of one or more vehicles intend to occupy the empty lane position. When the collision avoidance application determines that at least one driver intends to occupy the empty lane position, the collision avoidance application generates a collision risk value that drives an output signal. In various embodiments, the collision avoidance application responds to medium or high collision risk values by generating output values that notify at least one of the drivers of a potential collision associated with changing lanes into the empty lane position, while the collision avoidance application responds to low collision risk values by refraining from notifying a driver attempting to changing lanes into the empty lane position.

At least one technological advantage of the disclosed embodiments is that a driver of a vehicle is notified of potential collisions with vehicles that are not in adjacent lanes. In particular, by acquiring sensor data associated with vehicles from a near lane that is not immediately adjacent to the vehicle, the collision avoidance system may notify a driver of more potential collisions than would otherwise be detected by only analyzing vehicles that currently occupy the adjacent lane.

1. In various embodiments, a computer-implemented method comprises receiving, from at least one sensor, sensor data associated with an environment, generating, based on the sensor data, a set of lane change data values associated with positions of at least two vehicles relative to a first lane position in the environment, determining, based on the set of lane change data values, a collision risk value associated with the at least two vehicles attempting to occupy the first lane position, and generating, based on the collision risk value, an output signal to a first vehicle included in the at least two vehicles.

2. The computer-implemented method of clause 1, further comprising receiving, by the first vehicle, a turn signal associated with the first vehicle attempting to occupy the first lane position, where the first vehicle generates the set of lane change data values in response to receiving the turn signal.

3. The computer-implemented method of clause 1 or 2, further comprising determining, based on the sensor data, that the first lane position is unoccupied.

4. The computer-implemented method of any of clauses 1-3, where determining the collision risk value further comprises determining a first intention of a first driver of the first vehicle to occupy the first lane position, and the set of lane change data values includes at least one value associated with the first driver of the first vehicle or a driving parameter of the first vehicle.

5. The computer-implemented method of any of clauses 1-4, where determining the collision risk value further comprises determining a second intention of a second driver of a second vehicle included in the at least two vehicles to occupy the first lane position, and the set of lane change data values includes at least one value associated with the second driver of the second vehicle or a driving parameter of the second vehicle.

6. The computer-implemented method of any of clauses 1-5, where the set of lane change data values includes at least one of a head position of a first driver of the first vehicle or an eye gaze direction of the first driver.

7. The computer-implemented method of any of clauses 1-6, where determining the collision risk value comprises assigning a first weight value to the head position, and assigning a second weight value to the eye gaze direction, wherein the first weight value is less than the second weight value.

8. The computer-implemented method of any of clauses 1-7, where the output signal includes a notification signal that drives a component of the first vehicle to notify a first driver of the first vehicle.

9. The computer-implemented method of any of clauses 1-8, where the output signal changes at least one driving parameter of the first vehicle.

10. The computer-implemented method of any of clauses 1-9, where generating the set of lane change data values comprises identifying, by the first vehicle, a turn signal generated by a second vehicle of the at least two vehicles, wherein the turn signal is associated with the second vehicle attempting to occupy the first lane position.

11. In various embodiments, one or more non-transitory computer-readable media store instructions that, when executed by one or more processors, cause the one or more processors to perform the steps of receiving, from at least one sensor, sensor data associated with an environment, determining a first lane position in the environment in which at least one vehicle can occupy, generating, based on the sensor data, a set of lane change data values associated with positions of at least two vehicles relative to the first lane position, determining, based on the set of lane change data values, a collision risk value associated with the at least two vehicles attempting to occupy the first lane position, and generating, based on the collision risk value, an output signal to a first vehicle included in the at least two vehicles.

12. The one or more non-transitory computer-readable media of clause 11, where a second vehicle of the at least two vehicles is an autonomous-driving vehicle or a semi-autonomous-driving vehicle.

13. The one or more non-transitory computer-readable media of clause 11 or 12, where the sensor data includes at least one vehicle-to-vehicle signal generated by a second vehicle of the at least two vehicles.

14. The one or more non-transitory computer-readable media of any of clauses 11-13, where the sensor data includes image data of at least a portion of a second vehicle of the at least two vehicles.

15. The one or more non-transitory computer-readable media of any of clauses 11-14, where determining the collision risk value further comprises determining a first intention of a first driver of the first vehicle to occupy the first lane position, wherein the set of lane change data values includes at least one value associated with the first driver of the first vehicle or a driving parameter of the first vehicle, and determining a second intention of a second driver of a second vehicle included in the at least two vehicles to occupy the first lane position, wherein the set of lane change data values includes at least one value associated with the second driver of the second vehicle or a driving parameter of the second vehicle.

16. The one or more non-transitory computer-readable media of any of clauses 11-15, where the output signal includes a vehicle-to-vehicle signal generated by the first vehicle.

17. In various embodiments, a collision avoidance system comprises one or more memories storing a collision avoidance application, and one or more processors coupled to the one or more memories, and, when executing the collision avoidance application, are configured to receive, from at least one sensor, sensor data associated with an environment, generate, based on the sensor data, a set of lane change data values that includes a first lane change data value associated with a first vehicle attempting to occupy a first lane position in the environment, and a second lane change data value associated with a second vehicle attempting to occupy the first lane position, determine, based on the set of lane change data values, a collision risk value associated with both the first vehicle and the second vehicle attempting to occupy the first lane position, and generate, based on the collision risk value, an output signal to the first vehicle.

18. The collision avoidance system of clause 17, where at least one memory of the one or more memories and at least one processor of the one or more processors are included in the first vehicle.

19. The collision avoidance system of clause 17 or 18, where the one or more processors, when executing the collision avoidance application, are further configured to receive a turn signal associated with the first vehicle attempting to occupy the first lane position, and upon acquiring the sensor data, determining that the first lane position is unoccupied.

20. The collision avoidance system of any of clauses 17-19, where the set of lane change data values includes at least one of a head position of a first driver of the first vehicle or an eye gaze direction of the first driver.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method comprising:
receiving, from a sensor of a vehicle, sensor data of an environment;
generating lane change data for one or more other vehicles in the environment associated with an unoccupied lane position, the lane change data including a head position and an eye gaze direction of each driver of the one or more other vehicles;
determining, based on the lane change data, a likelihood of the one or more other vehicles attempting to change lanes into the unoccupied lane position;
generating a collision risk value based on the likelihood of the one or more other vehicles attempting to change lanes into the unoccupied lane position by assigning a first weight value to the head position and assigning a second weight value to the eye gaze direction; and
providing, based on the collision risk value, a collision risk notification to a driver of the vehicle or an advanced driver assistance system (ADAS) of the vehicle.

2. The computer-implemented method of claim 1, further comprising:
detecting, by the vehicle, a turn signal associated with the vehicle attempting to occupy the unoccupied lane position,
wherein the vehicle generates the lane change data in response to detecting the turn signal.

3. The computer-implemented method of claim 1, further comprising, prior to generating the lane change data, detecting the unoccupied lane position based on the sensor data of the environment.

4. The computer-implemented method of claim 1, further comprising:
determining a first intention of the driver of the vehicle to change lanes into the unoccupied lane position,
wherein the lane change data includes at least one value associated with (i) the driver of the vehicle, or (ii) a driving parameter of the vehicle.

5. The computer-implemented method of claim 1, wherein the lane change data includes at least one value associated with a driving parameter of the one or more other vehicles.

6. The computer-implemented method of claim 1, wherein the first weight value is less than the second weight value.

7. The computer-implemented method of claim 1, wherein the collision risk notification causes the ADAS of the vehicle to notify the driver of the vehicle.

8. The computer-implemented method of claim 1, wherein the collision risk notification causes the ADAS of the vehicle to change at least one driving parameter of the vehicle.

9. The computer-implemented method of claim 1, wherein the step of generating the lane change data further comprises identifying, by the vehicle, one or more turn signals generated by the one or more other vehicles.

10. One or more non-transitory computer-readable media storing instructions that, when executed by one or more processors, cause the one or more processors to perform the steps of:
receiving, from a sensor of a vehicle, sensor data of an environment;
generating lane change data for one or more other vehicles in the environment associated with an unoccupied lane position, the lane change data including a head position and an eye gaze direction of each driver of the one or more other vehicles;
determining, based on the lane change data, a likelihood of the one or more other vehicles attempting to change lanes into the unoccupied lane position;
generating a collision risk value based on the likelihood of the one or more other vehicles attempting to change lanes into the unoccupied lane position by assigning a first weight value to the head position and assigning a second weight value to the eye gaze direction; and providing, based on the collision risk value, a collision risk notification to a driver of the vehicle or an advanced driver assistance system (ADAS) of the vehicle.

11. The one or more non-transitory computer-readable media of claim 10, further comprising when a first vehicle of the one or more other vehicles is an autonomous-driving vehicle or a semi-autonomous-driving vehicle, modifying the first weight value and second weight value associated with the driver of the first vehicle to zero.

12. The one or more non-transitory computer-readable media of claim 10, wherein the sensor data of the environment includes at least one vehicle-to-vehicle signal generated by one of the one or more other vehicles.

13. The one or more non-transitory computer-readable media of claim 10, wherein the sensor data of the environment includes image data of at least a portion of the one or more other vehicles.

14. The one or more non-transitory computer-readable media of claim 10, wherein the step of generating the collision risk value further comprises:
    determining a first intention of the driver of the vehicle to change lanes into the unoccupied lane position,
    wherein the lane change data includes at least one value associated with (i) the driver of the vehicle, or (ii) a driving parameter of the vehicle.

15. The one or more non-transitory computer-readable media of claim 10, wherein the collision risk notification includes a vehicle-to-vehicle signal generated by the ADAS of the vehicle.

16. A collision avoidance system comprising:
    one or more memories in a vehicle storing a collision avoidance application; and
    one or more processors in the vehicle coupled to the one or more memories that, when executing the collision avoidance application, are configured to:
        receive, from a sensor of the vehicle, sensor data of an environment,
        generate lane change data for one or more other vehicles in the environment associated with an unoccupied lane position, the lane change data including a head position and an eye gaze direction of each driver of the one or more other vehicles,
        determine, based on the lane change data, a likelihood of the one or more other vehicles attempting to change lanes into the unoccupied lane position,
        generate a collision risk value based on the likelihood of the one or more other vehicles attempting to change lanes into the unoccupied lane position by assigning a first weight value to the head position and assigning a second weight value to the eye gaze direction, and
        provide, based on the collision risk value, a collision risk notification to a driver of the vehicle or an advanced driver assistance system (ADAS) of the vehicle.

17. The collision avoidance system of claim 16, wherein the one or more processors, when executing the collision avoidance application, are further configured to:
    detect, by the vehicle, a turn signal associated with the vehicle attempting to occupy the unoccupied lane position; and
    upon acquiring the sensor data, identifying the unoccupied lane position.

* * * * *